United States Patent
Wei et al.

(10) Patent No.: US 12,149,072 B2
(45) Date of Patent: Nov. 19, 2024

(54) PHOTOVOLTAIC SYSTEM, RAPID SHUTDOWN DEVICE (RSD) AND PHOTOVOLTAIC SYSTEM DETECTION METHOD

(71) Applicant: BravoTek Electronics Co., Ltd., Zhubei (TW)

(72) Inventors: Wei-Hsin Wei, Zhubei (TW); Teng-Hung Chang, Zhubei (TW); Hsueh-Chun Lin, Jiaoxi Township, Yilan County (TW); Cheng-Lien Wang, Taoyuan (TW)

(73) Assignee: BravoTek Electronics Co., Ltd., Zhubei (TW)

( * ) Notice: Subject to any disclaimer, the term of this patent is extended or adjusted under 35 U.S.C. 154(b) by 0 days.

(21) Appl. No.: 18/122,443

(22) Filed: Mar. 16, 2023

(65) Prior Publication Data
US 2024/0283246 A1 Aug. 22, 2024

(30) Foreign Application Priority Data
Feb. 16, 2023 (TW) .................................. 112105627

(51) Int. Cl.
*H02J 3/00* (2006.01)
*H02S 50/00* (2014.01)

(52) U.S. Cl.
CPC .............. *H02J 3/001* (2020.01); *H02S 50/00* (2013.01)

(58) Field of Classification Search
CPC ................................. H02J 3/001; H02S 50/00
See application file for complete search history.

(56) References Cited

FOREIGN PATENT DOCUMENTS

KR           2024008584 A  *  1/2024

* cited by examiner

*Primary Examiner* — Daniel Cavallari
(74) *Attorney, Agent, or Firm* — Innovation Counsel LLP

(57) ABSTRACT

A rapid shutdown device (RSD) includes: a logic-and-analog circuit; an RSD ID storage for storing an unique RSD ID; a control command receiving circuit for receiving and decode a control command including a combination of an all-RSD turn-on command, a single-RSD turn-on command and a to-be-tested RSD ID; a switch circuit connected to the logic-and-analog circuit; and a bypass circuit connected between two output terminals of the RSD. When the switch circuit is turned off, the bypass circuit is turned on. The logic-and-analog circuit controls the on/off state of the switch circuit according to a decoding result of the control command receiving circuit and the unique RSD ID stored in the RSD ID storage. When the switch circuit is turned on, an output voltage received from a photovoltaic module coupled to the RSD is outputted via the RSD.

12 Claims, 6 Drawing Sheets

PHOTOVOLTAIC SYSTEM, RAPID SHUTDOWN DEVICE (RSD) AND PHOTOVOLTAIC SYSTEM DETECTION METHOD

This application claims the benefit of Taiwan application Serial No. 112105627, filed Feb. 16, 2023, the subject matter of which is incorporated herein by reference.

BACKGROUND OF THE INVENTION

Field of the Invention

The invention relates in general to a photovoltaic system, a rapid shutdown device (RSD) and a photovoltaic system inspection method.

Description of the Related Art

Along with the rise in environmental awareness, clean energy is attracting more and more attention. Solar energy generation pertains the category of the clean energy.

However, the photovoltaic system still has high voltage during the power cut, making fire fighters unable to put out the fire effectively. Hence, the rapid shutdown device (RSD) is developed and provided. Through external control, the serial connection of the photovoltaic modules is quickly disconnected to reduce the high voltage of the system. For instance, it is stipulated in the regulations of some countries, the power of the photovoltaic system of the rooftop solar system must be interrupted at module level, so that the photovoltaic system voltage can be quickly reduced.

As electric vehicles are strongly advocated in many countries, the popularity of electric vehicles requires the availability of a large volume of electricity and assistance of solar energy storage (combination of light and storage). Nonetheless, the charging of electric vehicles may increase fire risk.

The lifespan of an RSD is the same as that of a photovoltaic system (such as 20 years). When the RSD has abnormalities, the voltage output of the photovoltaic module of the photovoltaic system will be affected, and there will be loss in solar energy generation.

Currently, the RSD function is inspected using a detector which is directly connected to the output end of the RSD. However, during inspection, if the photovoltaic system is installed on a tiled roof or is provided with trunking protection, the modules need to be dismounted and measured one by one (RSD is installed under the photovoltaic module), not only incurring a large amount of labor and time, but further greatly increasing system maintenance cost.

Therefore, it has become an imminent task for the industries to provide a new photovoltaic system, a new rapid shutdown device (RSD) and a new system inspection method. Without dismounting the photovoltaic module, the RSD modules are quickly inspected to locate abnormal ones, then only specific photovoltaic module and specific RSD module are dismounted. Thus, system maintenance cost can be greatly reduced.

SUMMARY OF THE INVENTION

According to one embodiment of the present invention, a rapid shutdown device (RSD) is provided. The RSD includes: a logic-and-analog circuit; an RSD ID storage connected to the logic-and-analog circuit to store an unique RSD ID; a control command receiving circuit connected to the logic-and-analog circuit to receive and decode a control command, wherein the control command includes a combination of: an all-RSD turn-on command, a single-RSD turn-on command, a to-be-tested RSD ID; a switch circuit connected to the logic-and-analog circuit; and a bypass circuit connected between two output terminals of the RSD, wherein when the switch circuit is turned off, the bypass circuit is turned on. The logic-and-analog circuit controls the on/off state of the switch circuit according to a decoding result of the control command receiving circuit and the unique RSD ID stored in the RSD ID storage. When the switch circuit is turned on, an output voltage received from a photovoltaic module coupled to the RSD is outputted via the RSD.

According to another embodiment of the present invention, a photovoltaic system is provided. The photovoltaic system includes: a plurality of photovoltaic modules; a plurality of rapid shutdown devices (RSDs) coupled to the photovoltaic modules, wherein the photovoltaic modules receives solar energy to output a voltage to the RSDs connected in series, and each RSDs has a unique ID stored therein; a photovoltaic (PV) inverter selectively stringing the RSDs, wherein in a system power generation mode, a string controller of the PV inverter emits an all-RSD turn-on command to the RSDs; and a signal detector selectively stringing the RSDs, wherein in a system inspection mode, the signal detector emits a single-RSD turn-on command a to-be-tested RSD ID to the RSDs to inspect whether a to-be-tested RSD of the RSDs and the photovoltaic module coupled to the to-be-tested RSD are normal.

According to an alternate embodiment of the present invention, a system inspection method for a photovoltaic system is provided. The photovoltaic system includes a plurality of rapid shutdown devices (RSD) and a plurality of photovoltaic modules. The system inspection method includes: in a system inspection mode, setting a to-be-tested RSD ID; emitting, by a signal detector, a control command including the to-be-tested RSD ID and a single-RSD turn-on command to a to-be-tested RSD of the RSDs; receiving, by the signal detector, an output voltage received from the to-be-tested RSD; determining whether all RSDs are inspected; when not all RSDs are inspected, updating the to-be-tested RSD ID, and emitting the control command including the updated to-be-tested RSD ID and the single-RSD turn-on command to the next to-be-tested RSD; and when all RSDs are inspected, outputting an output voltage curve received by the signal detector.

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical terms are used in the specification with reference to the prior art used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all technical features of any embodiment of the present invention.

Figure 1:
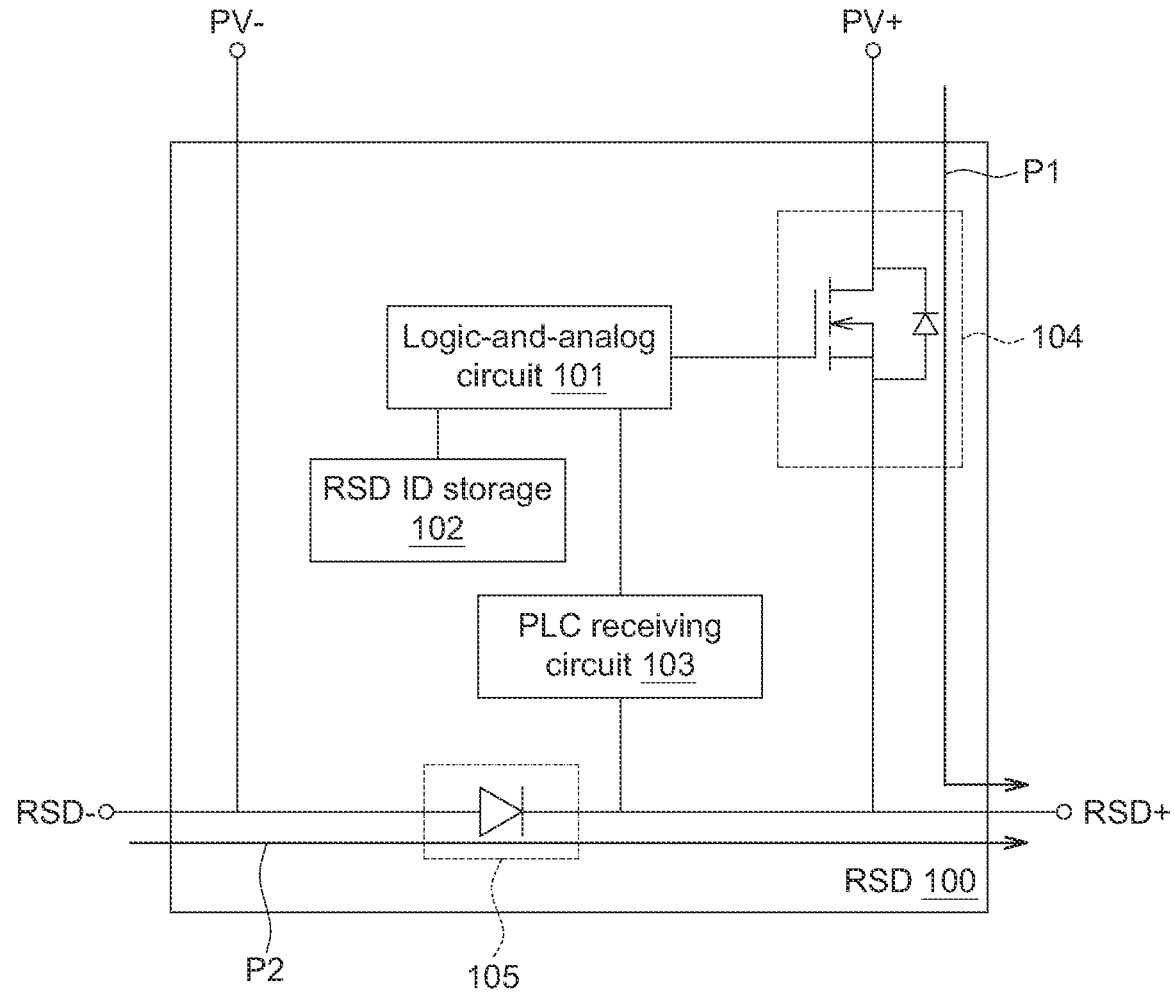
FIG. 1 is a functional block diagram of a rapid shutdown device (RSD) according to an embodiment of the present invention.

Referring to FIG. 1, a functional block diagram of a rapid shutdown device (RSD) according to an embodiment of the present invention is shown. As indicated in FIG. 1, the RSD 100 includes: a logic-and-analog circuit 101, an RSD ID storage 102, a power line communication (PLC) receiving circuit 103, at least one MOSFET switch 104 and a bypass diode 105. The power line communication (PLC) receiving circuit 103 is also referred as control command receiving circuit. The at least one MOSFET switch 104 and the bypass diode 105 are also referred as the switch circuit and the bypass circuit.

The PLC receiving circuit 103 is connected to the logic-and-analog circuit 101. The PLC receiving circuit 103 receives and decodes a PLC control command received from the string controller (arranged in the photovoltaic (PV) inverter or independent of the PV inverter) or the signal detector. The PLC control command includes a combination of an all-RSD turn-on command, a single-RSD turn-on command, a to-be-tested RSD ID.

The logic-and-analog circuit 101 controls the on/off state of MOSFET switch 104 according to a decoding result of the PLC receiving circuit 103 and the unique ID stored in the RSD ID storage 102. To put it in greater details, when the logic-and-analog circuit 101 determines through comparison that the to-be-tested RSD ID of the PLC control command decoded by the PLC receiving circuit 103 matches the unique ID stored in the RSD ID storage 102, the logic-and-analog circuit 101 controls the MOSFET switch 104 to be turned on (when the PLC control command includes: an RSD turn-on command (including an all-RSD turn-on command or a single-RSD turn-on command)). When the logic-and-analog circuit 101 determines through comparison that the to-be-tested RSD ID of the PLC control command decoded by the PLC receiving circuit 103 does not match the unique ID stored in the RSD ID storage 102, the RSD 100 neglects the PLC control command, and the logic-and-analog circuit 101 controls the MOSFET switch 104 to be turned off.

The MOSFET switch 104 is connected to the logic-and-analog circuit 101. When the MOSFET switch 104 is turned on, the output voltage of the photovoltaic module coupled to the RSD 100 can be outputted to the PV inverter or the signal detector via the RSD 100; and, when the MOSFET switch 104 is turned off, the output voltage of the photovoltaic module coupled to the RSD 100 cannot be outputted via the RSD 100.

The RSD ID storage 102 is connected to the logic-and-analog circuit 101 to store the unique ID of the RSD 100.

The bypass diode 105 is coupled between two output terminals RSD+ and RSD− of the RSD 100. When the MOSFET switch 104 is turned off, the bypass diode 105 is turned on to form a substitute path.

When the MOSFET switch 104 is turned on, the current path of the RSD 100 is path P1; and, when the bypass diode 105 is turned on, the current path of the RSD 100 is path P2.

That is, in an embodiment of the present invention, the on/off state of the MOSFET switch 104 is controlled by the PLC control command decoded by the PLC receiving circuit 103, so that the voltage of the photovoltaic module (connected to interfaces PV+ and PV−) can be outputted to the interfaces RSD+ and RSD−, then is outputted to the PV inverter or the signal detector.

Besides, the unique ID stored in the RSD 100 can be displayed outside the RSD 100 in the form of label or barcode, so that in the system inspection mode, the operator can input the to-be-tested RSD ID to the signal detector for RSD inspection.

Figure 2A:
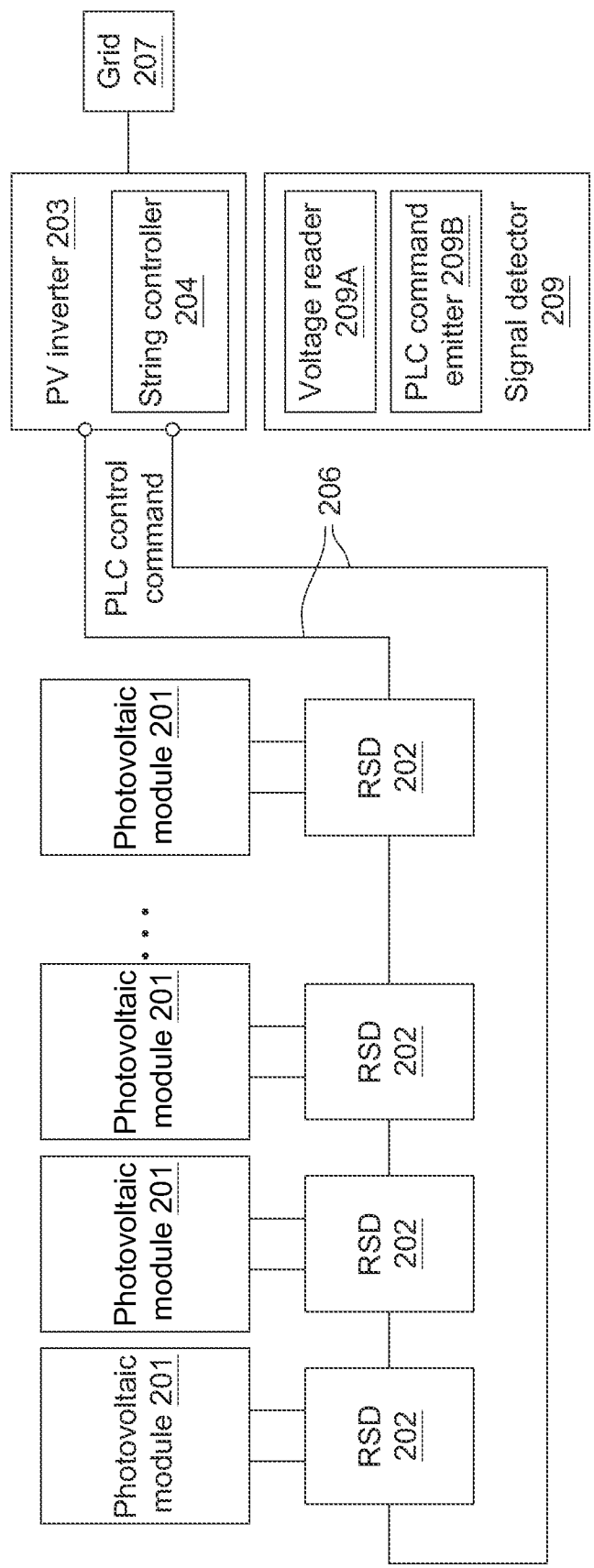
FIG. 2A and FIG. 2B respectively are schematic diagrams of system power generation mode and system inspection mode of a photovoltaic system according to an embodiment of the present invention.
Figure 2B:
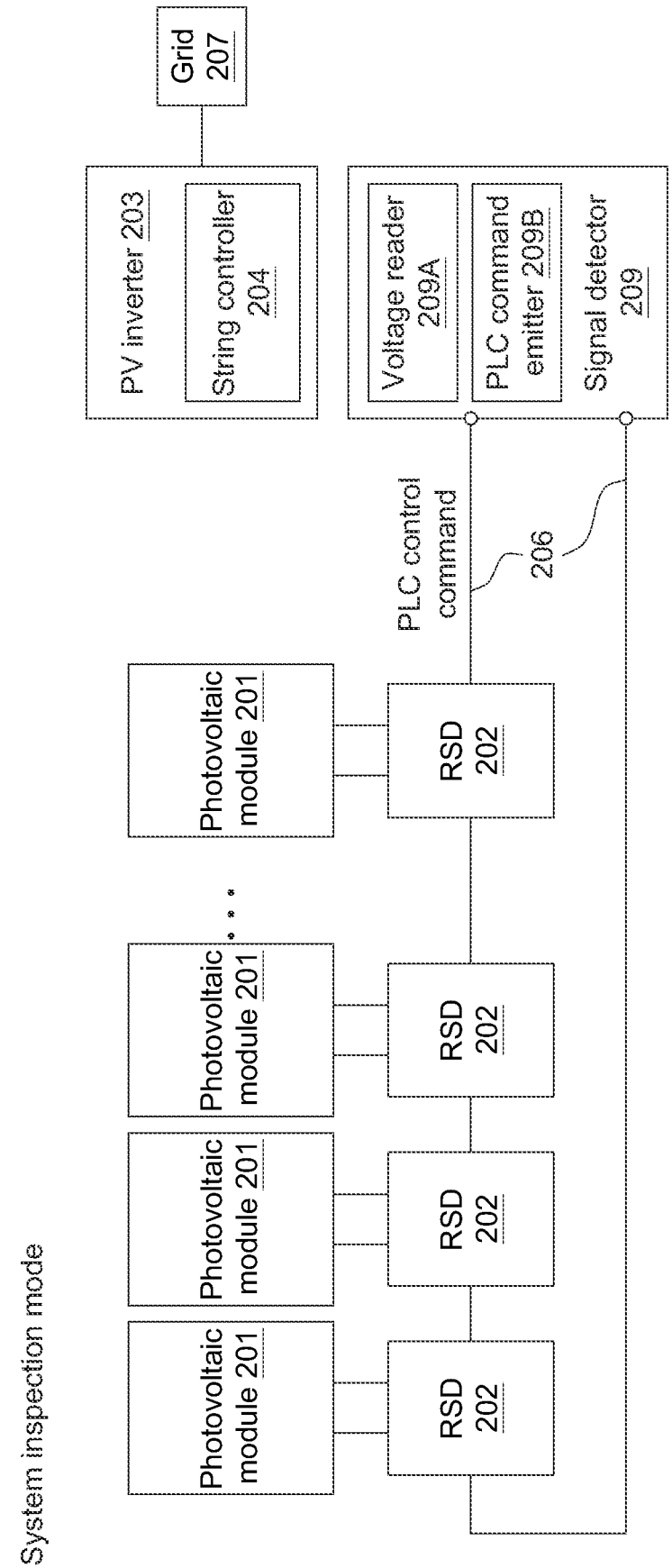

FIG. 2A and FIG. 2B respectively are schematic diagrams of system power generation mode and system inspection mode of a photovoltaic system according to an embodiment of the present invention. The photovoltaic system 200 includes: a plurality of photovoltaic modules 201, a plurality of rapid shutdown devices (RSD) 202, a PV inverter 203, a cable 206, and a signal detector 209. The PV inverter 203 further includes a string controller 204. The signal detector 209 includes: a voltage reader 209A and a PLC command emitter 209B. The PV inverter 203 is further connected to a grid 207.

The photovoltaic modules 201 are connected to the RSDs 202. The photovoltaic modules 201 can receive a solar energy to output a voltage to the RSDs 202. The RSDs 202 are similar to the RSD 100 of FIG. 1, and the similarities are not repeated here. In the diagram, the RSDs 202 are connected in series. In the system power generation mode, the serially connected RSDs 202 are connected to the PV inverter 203; in the system inspection mode, the serially connected RSDs 202 are connected to the signal detector 209.

As indicated in FIG. 2A, in the system power generation mode, the PV inverter 203 is connected to the RSDs 202, and the string controller 204 of the PV inverter 203 can emit an "all-RSD turn-on PLC command" to the RSDs 202. In other possible embodiments of the present invention, the string controller 204 can be independent of the PV inverter 203, that is, the string controller 204 can be located outside the PV inverter 203, and the said arrangement is still within the scope of the spirit of the present invention.

The cable 206 is used to connect the serially connected RSDs 202 connected to the PV inverter 203 or the signal detector 209.

As indicated in FIG. 2B, in the system inspection mode, the signal detector 209 can emit a "single-RSD turn-on PLC command" and a "to-be-tested RSD ID" to the RSDs 202. Details of inspection are disclosed below. The voltage reader 209A can be used to read the output voltage from the target RSDs 202. The PLC command emitter 209B can emit a PLC control command to the target RSDs 202.

In an embodiment of the present invention, during inspection, the inspection personnel can input the to-be-tested RSD ID to the signal detector 209 directly or via a notebook computer or a smart phone. In response to the input of the to-be-tested RSD ID, the PLC command emitter 209B can emit a single-RSD turn-on PLC command (including the to-be-tested RSD ID inputted to the signal detector 209) to the target RSDs 202. The notebook computer or the smart phone can be connected to the signal detector 209 via wireless or cabled communication. When the signal detector 209 receives the output voltage from the target RSDs 202, the signal detector 209 can inspect the next to-be-tested RSD 202 (that is, PLC command emitter 209B can emit a PLC control command (including "single-RSD turn-on PLC command" and "next to-be-tested RSD ID") to the next target RSD 202. Thus, the RSDs 202 can be inspected sequentially or by turns.

As indicated in FIG. 2A, the photovoltaic system 200 is in a system power generation mode. In the system power generation mode (that is, the photovoltaic system 200 performs ordinary solar energy generation), the string controller 204 of the PV inverter 203 emits an all-RSD turn-on PLC command to all RSDs 202 to turn on all RSDs 202. In response to the said operation, all MOSFET switches 104 inside the RSDs 202 are turned on, so that the output voltages of the photovoltaic modules 201 can be added up and transmitted to the PV inverter 203 via the cable 206. Then the PV inverter 203 performs DC-to-AC conversion and connects to the grid 207.

In the system power generation mode, when the grid 207 disappears, the cable 206 breaks, or the operator switches the button to the OFF state (for instance, when fire disaster occurs), the string controller 204 stops emitting the all-RSD turn-on PLC signal to all RSDs 202. If the turn-on signal is not received within a period of time, the RSDs 202 automatically shuts down (all MOSFET switches 104 inside the RSDs 202 are turned off and the bypass diode 105 is turned on), the voltage of the photovoltaic modules 201 is not outputted, the high voltage of the photovoltaic system 200 drops, and the photovoltaic system 200 stops power generation.

As indicated in FIG. 2B, the photovoltaic system 200 is in a system inspection mode. In the system inspection mode, whether the photovoltaic modules 201 and/or the RSDs 202 of the photovoltaic system 200 operate normally can be inspected. In the system inspection mode, the signal detector 209 is connected to the RSDs 202, and the PV inverter 203 and the string controller 204 are disconnected from the RSDs 202.

In response to the inspection personnel inputting a designated to-be-tested RSD ID, the PLC command emitter 209B emits a single-RSD turn-on PLC command (including the inputted to-be-tested RSD ID) to the target RSD 202.

When the to-be-tested RSD 202 receives the PLC control command from the PLC command emitter 209B, if the command is for inspecting whether the photovoltaic modules 201 operate normally, the MOSFET switch 104 of the to-be-tested RSD 202 is turned on and the bypass diode 105 is turned off (but the MOSFET switches 104 of the remaining to-be-tested RSDs 202 are turned off and the bypass diode 105 is turned on), so that the voltage of the photovoltaic module 201 coupled to the to-be-tested RSD 202 is outputted to the voltage reader 209A of the signal detector 209. After all RSDs 202 are sequentially turned on, the voltage reader 209A can output the received output voltage curve to the display screen of the signal detector 290, a notebook computer or a smart phone. The inspection personnel can observe the output voltage curve to determine whether the RSDs are damaged, whether the bypass diode of the photovoltaic module is short circuited, and whether potential induced degradation (PID) phenomenon occurs to the photovoltaic system 200.

For instance, when the RSD 202 (ID=1) is inspected, the MOSFET switch 104 inside the RSD 202 (ID=1) is turned on and the bypass diode 105 is turned off; the MOSFET switches 104 inside the untested RSDs 202 (ID=2~n) are turned off and the bypass diode 105 is turned on, so that the output voltage of the photovoltaic modules 201 coupled to the RSD 202 (ID=1) is outputted to the signal detector 209. After the voltage reader 209A receives an output voltage from the RSD 202 (ID=1), the PLC command emitter 209B can emit a "single-RSD turn-on PLC command" and a "to-be-tested RSD ID (ID=2)" to continue with the inspection of the RSD 202 (ID=2). The above operation is repeated until all RSDs 202 are inspected.

Figure 3:
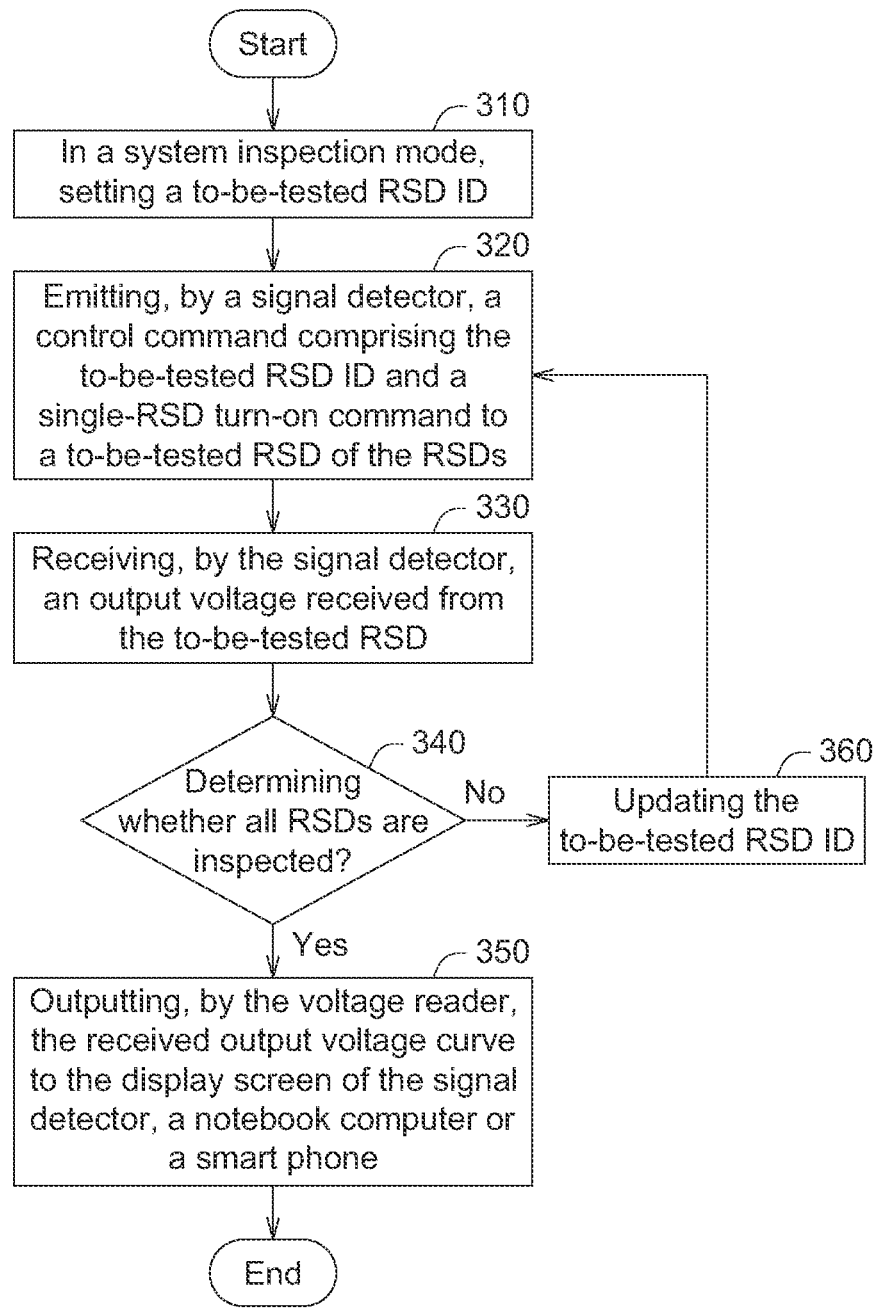
FIG. 3 is a flowchart of a system inspection method for a photovoltaic system according to an embodiment of the present invention.

FIG. 3 is a flowchart of a system inspection method for a photovoltaic system according to an embodiment of the present invention. The system inspection method for a photovoltaic system according to an embodiment of the present invention includes the following steps. In step 310, in a system inspection mode, a to-be-tested RSD ID is set (exemplarily but not restrictively, ID=1). In step 320, a to-be-tested RSD ID and a control command of a single-RSD turn-on command are emitted to a to-be-tested RSD by the signal detector. In step 330, an output voltage is received from the to-be-tested RSD by the signal detector. In step 340, whether all RSD are inspected is determined (for instance, whether the to-be-tested RSD ID=n): if the determination in step 340 is affirmative (which means all RSDs are inspected), then the voltage reader 209A outputs the received output voltage curve to the display screen of the signal detector 290, a notebook computer or a smart phone (step 350); if the determination in step 340 is negative, then the to-be-tested RSD ID is updated (exemplarily but not restrictively, ID=ID+1) (step 360), and the method returns to step 320. In step 320, the updated to-be-tested RSD ID and the control command of the single-RSD turn-on command are emitted to the next to-be-tested RSD. The above steps are repeated until all RSDs 202 are inspected.

Figure 4A:
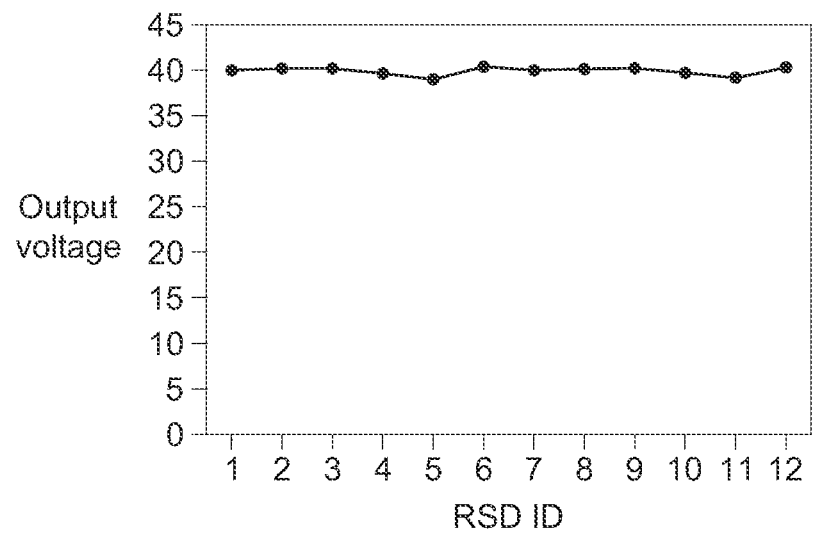
FIGS. 4A-4D are output voltage curve charts of a signal detector according to an embodiment of the present invention.
Figure 4B:
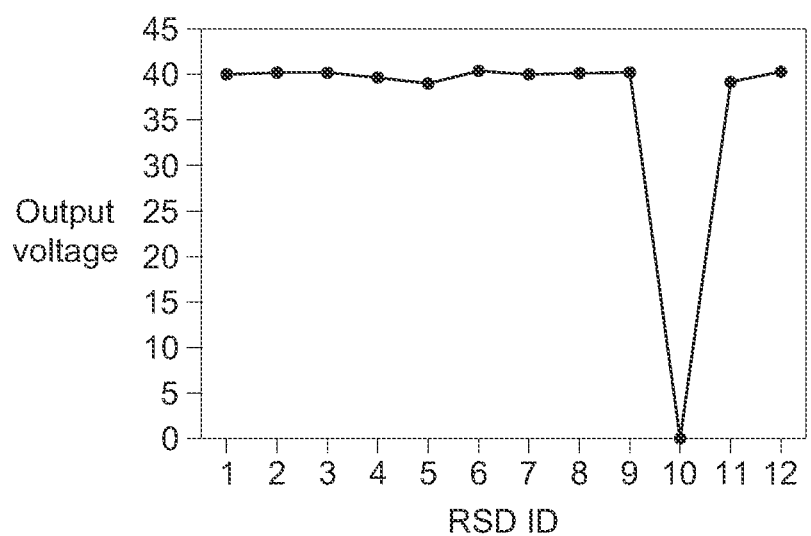
Figure 4C:
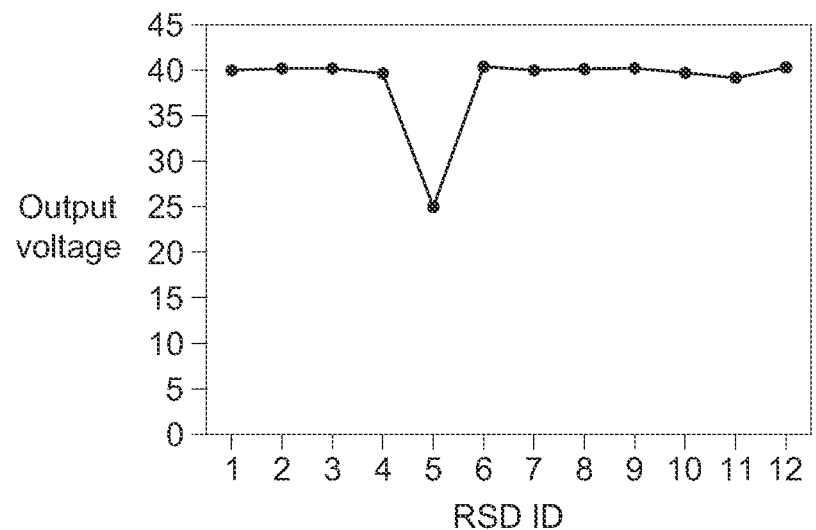
Figure 4D:
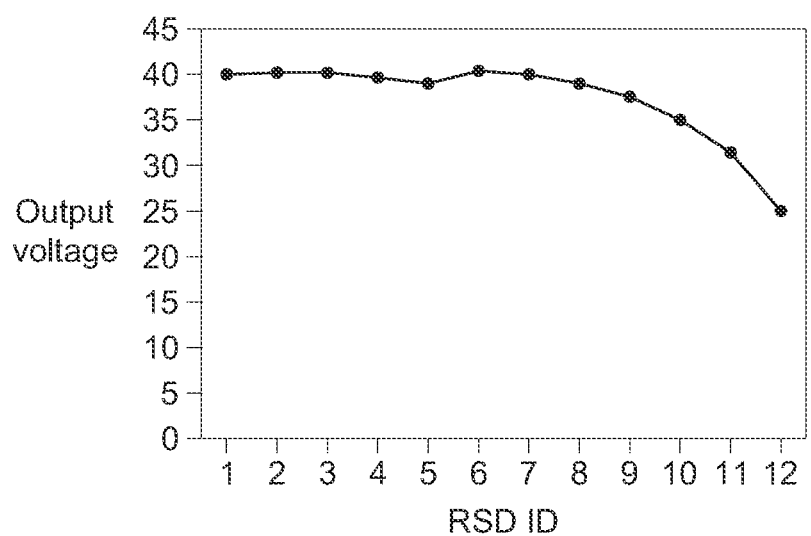

FIGS. 4A-4D are output voltage curve charts of a signal detector according to an embodiment of the present invention. FIG. 4A shows the output voltage curve obtained when the function of the RSDs and the photovoltaic modules are normal. FIG. 4B shows the output voltage curve obtained when the RSD (ID=10) is damaged. FIG. 4C shows the output voltage curve obtained when the bypass diode of the photovoltaic modules 201 coupled to the RSD 202 (ID=5) is short circuited. FIG. 4D shows the output voltage curve obtained when PID phenomenon occurs to the photovoltaic system.

In an embodiment of the present invention, the PLC can use frequency-shift keying (FSK) modulation mechanism. If the signal detector 209 is a movable device, the signal detector 209 can be wirelessly connected to a smart phone or a notebook computer. In an embodiment of the present invention, the signal detector 209 can be integrated into the PV inverter 203 or the string controller. Under such circumstance, during inspection, the inverter function of the PV inverter 203 must be turned off.

In an embodiment of the present invention, the RSD can control one or more than one photovoltaic module. Although the functional bock diagram of an RSD is illustrated in FIG. 1, the RSD can have other implementations in other possible embodiments of the present invention (for instance, the logic-and-analog circuit 101 can have several IC combinations). The block diagram of FIG. 1 is for exemplary purpose only, and the spirit and contents of the present invention are as disclosed above.

In an embodiment of the present invention, the RSD ID can be displayed outside the RSD in the form of label or barcode. Moreover, after the photovoltaic system 200 is arranged, the arrangement can be combined with the system configuration diagram of the photovoltaic system 200 to generate correspondence data between RSD ID and module position can be generated.

In an embodiment of the present invention, through the PLC communication protocols and the optimization of internal control chip design of the RSD, a part of the serially connected RSDs can be independently turned on or turned off. Therefore, during inspection, there is no need to dismount the photovoltaic modules in advance or inspect the photovoltaic modules one by one. Conversely, the inspection personnel only need to connect a signal detector to the junction between the photovoltaic module and the inverter (to the DC box for instance) to inspect the serially connected RSDs. Thus, the inspection method according to the embodiment of the present invention is safe and time saving.

While the invention has been described by way of example and in terms of the embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A rapid shutdown device (RSD), comprising:
   a logic-and-analog circuit;
   an RSD ID storage connected to the logic-and-analog circuit to store an unique RSD ID;
   a control command receiving circuit connected to the logic-and-analog circuit to receive and decode a control command, wherein the control command comprises a combination of: an all-RSD turn-on command, a single-RSD turn-on command, and a to-be-tested RSD ID;
   a switch circuit connected to the logic-and-analog circuit; and
   a bypass circuit connected between two output terminals of the RSD, wherein when the switch circuit is turned off, the bypass circuit is turned on,
   wherein,
   the logic-and-analog circuit controls the switch circuit according to a decoding result of the control command receiving circuit and the unique RSD ID stored in the RSD ID storage, and
   when the switch circuit is turned on, an output voltage received from a photovoltaic module coupled to the RSD is outputted via the RSD.

2. The rapid shutdown device according to claim 1, wherein, when the to-be-tested RSD ID of the control command matches the unique RSD ID stored in the RSD ID storage, the logic-and-analog circuit controls the switch circuit to be turned on; and
   when the to-be-tested RSD ID of the control command does not match the unique RSD ID stored in the RSD ID storage, the RSD neglects the control command, and the switch circuit is turned off.

3. The rapid shutdown device according to claim 1, wherein, the control command receiving circuit is a power line communication (PLC) receiving circuit.

4. The rapid shutdown device according to claim 1, wherein, the unique RSD ID stored in the RSD ID storage is displayed outside the RSD in label or barcode.

5. The rapid shutdown device according to claim 1, wherein,
   the switch circuit comprises at least one MOSFET switch, and the bypass circuit at least comprises a bypass diode; and
   the RSD controls one or more than one photovoltaic module.

6. A photovoltaic system, comprising:
   a plurality of photovoltaic modules;
   a plurality of rapid shutdown devices (RSDs) coupled to the photovoltaic modules, wherein the photovoltaic modules receive solar energy to output a voltage to the RSDs connected in series, and each RSD has a unique ID stored therein;
   a photovoltaic (PV) inverter selectively stringing the RSDs, wherein in a system power generation mode, a string controller of the PV inverter emits an all-RSD turn-on command to the RSDs; and
   a signal detector selectively stringing the RSDs,
   wherein in a system inspection mode, the signal detector emits a single-RSD turn-on command and a to-be-tested RSD ID to the RSDs to inspect whether a to-be-tested RSD of the RSDs and the photovoltaic module coupled to the to-be-tested RSD are normal.

7. The photovoltaic system according to claim 6, wherein, in the system inspection mode, the signal detector sequentially emits the single-RSD turn-on command and a plurality of different to-be-tested RSD IDs to the RSDs to output a voltage of the photovoltaic modules to the signal detector, the signal detector outputs a received output voltage curve to the signal detector, a notebook computer, or a smart phone to determine whether the RSDs are damaged, whether a bypass diode of the photovoltaic modules is short circuited, and whether a potential induced degradation (PID) phenomenon occurs to the photovoltaic system.

8. The photovoltaic system according to claim 6, wherein, each RSD comprises:
   a logic-and-analog circuit;
   an RSD ID storage connected to the logic-and-analog circuit to store an unique RSD ID;
   a control command receiving circuit connected to the logic-and-analog circuit to receive and decode the control command, wherein the control command comprises a combination of: an all-RSD turn-on command, a single-RSD turn-on command, and a to-be-tested RSD ID;
   a switch circuit connected to the logic-and-analog circuit; and
   a bypass circuit connected between two output terminals of the RSD, wherein when the switch circuit is turned off, the bypass circuit is turned on,
   wherein,
   the logic-and-analog circuit controls the on/off state of the switch circuit according to a decoding result of the control command receiving circuit and the unique RSD ID stored in the RSD ID storage,
   when the switch circuit is turned on, an output voltage received from a photovoltaic module coupled to the RSD is outputted via the RSD.

9. The photovoltaic system according to claim 8, wherein, when the to-be-tested RSD ID of the control command matches the unique RSD ID stored in the RSD ID storage, the logic-and-analog circuit controls the switch circuit to be turned on; and
   when the to-be-tested RSD ID of the control command does not match the unique RSD ID stored in the RSD ID storage, the RSD neglects the control command, and the switch circuit is turned off.

10. The photovoltaic system according to claim 8, wherein, the control command receiving circuit is a power line communication (PLC) receiving circuit.

11. The photovoltaic system according to claim 8, wherein, the unique RSD ID stored in the RSD ID storage is displayed outside the RSD in the form of label or barcode.

12. The photovoltaic system according to claim 8, wherein, the switch circuit comprises at least one MOSFET switch, and, the bypass circuit comprises at least one bypass diode; and the RSD controls one or more than one photovoltaic module.

* * * * *